United States Patent
Hsueh

(10) Patent No.: US 6,479,915 B2
(45) Date of Patent: Nov. 12, 2002

(54) STRUCTURE OF A SUBMERGED MOTOR

(76) Inventor: Hung-Ming Hsueh, PO Box 82-144, Taipei (TW)

( * ) Notice: Subject to any disclaimer, the term of this patent is extended or adjusted under 35 U.S.C. 154(b) by 0 days.

(21) Appl. No.: 09/800,657

(22) Filed: Mar. 8, 2001

(65) Prior Publication Data

US 2002/0125776 A1 Sep. 12, 2002

(51) Int. Cl.⁷ .............................. H02K 5/10; F04B 49/00
(52) U.S. Cl. ............................................. 310/87; 417/36
(58) Field of Search ................................ 310/87, 68 R, 310/71, 73, 68 C, 68 A; 417/35, 36, 38, 44.4, 423.3, 423.7; 318/482, 642; 210/169, 416.2; 119/245, 253, 255, 256, 267–269, 265, 266; 239/18, 12; 415/24; 73/1 H

(56) References Cited

U.S. PATENT DOCUMENTS

| | | | | |
|---|---|---|---|---|
| 4,265,262 A | * | 5/1981 | Hotine | 137/2 |
| 4,678,403 A | * | 7/1987 | Rudy et al. | 307/118 |
| 4,998,865 A | * | 3/1991 | Nakanishi et al. | 310/51 |
| 5,200,872 A | * | 4/1993 | D'Entremont et al. | 310/68 C |
| 5,266,190 A | * | 11/1993 | Tominaga | 119/259 |
| 6,072,255 A | * | 6/2000 | Chiang | 310/67 R |
| 6,279,835 B1 | * | 8/2001 | Hansen | 239/17 |

* cited by examiner

Primary Examiner—Dang Dinh Le
(74) Attorney, Agent, or Firm—Leong C. Lei

(57) ABSTRACT

A submerged motor which includes a lower housing formed with a plurality of openings, an upper housing engaged with a top of the lower housing, a motor including a rotor and a solenoid enclosing the rotor, the chamber being in communication with the water outlet and having a hole communicated with the lower housing, the circuit board being provided with a pair of sensors and connected with an electrical plug via a first electrical cord, an impeller being fixedly mounted on the rotor, and a cover configured to engage with the upper housing so as to close the recess thereby protecting the circuit board from damage, whereby only when the water level is above all of the two sensors will the submerged motor be turned on thereby preventing any accidents caused by overheating of the motor.

1 Claim, 6 Drawing Sheets

STRUCTURE OF A SUBMERGED MOTOR

BACKGROUND OF THE INVENTION (a) Field of the Invention

The present invention relates to an improvement in the structure of a submerged motor and in particular to one which will stop working when it is above the water level.

(b) Description of the Prior Art

It has been found that the conventional submerged motor is designed for use in water so that once the water level in a container is lowered below submerged motor due to evaporation or the breaking of the container, the submerged motor will become overheated thereby possibly causing short circuiting and even causing a fire accident.

Therefore, it is an object of the present invention to provide a submerged motor which can obviate and mitigate the above-mentioned drawbacks.

SUMMARY OF THE INVENTION

This invention is related to an improvement in the structure of a submerged motor.

According to a preferred embodiment of the present invention, a submerged motor which includes a lower housing formed with a plurality of openings for passage of water, an upper housing engaged with a top of the lower housing and formed with a water outlet at a top thereof, a motor including a rotor and a solenoid enclosing the rotor and being fitted with a chamber of the upper housing, the chamber being in communication with the water outlet and has a hole communicated with the lower housing, the motor being electrically connected with a circuit board which is fitted in a recess of the upper housing, the circuit board being provided with a pair of sensors and connected with an electrical plug via a first electrical cord, an impeller being fixedly mounted on the rotor so that when the motor is turned on, the impeller will be rotated in unison with the rotor thereby forcing water of the outlet, and a cover configured to engage with the upper housing so as to close the recess thereby protecting the circuit board from damage.

It is the primary object of the present invention to provide an improved submerged motor which will stop rotating when it is above the water level.

It is another object of the present invention to provide an improved submerged motor which is safe in operation.

It is still another object of the present invention to provide an improved submerged motor which is durable in use.

It is still another object of the present invention to provide an improved submerged motor which will work only when both sensors are immersed in water.

It is still another object of the present invention to provide an improved submerged motor which has a halogen light for adorning the fountain formed by the motor.

It is a further object of the present invention to provide an improved submerged motor which will not be overheated to cause any accidents.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
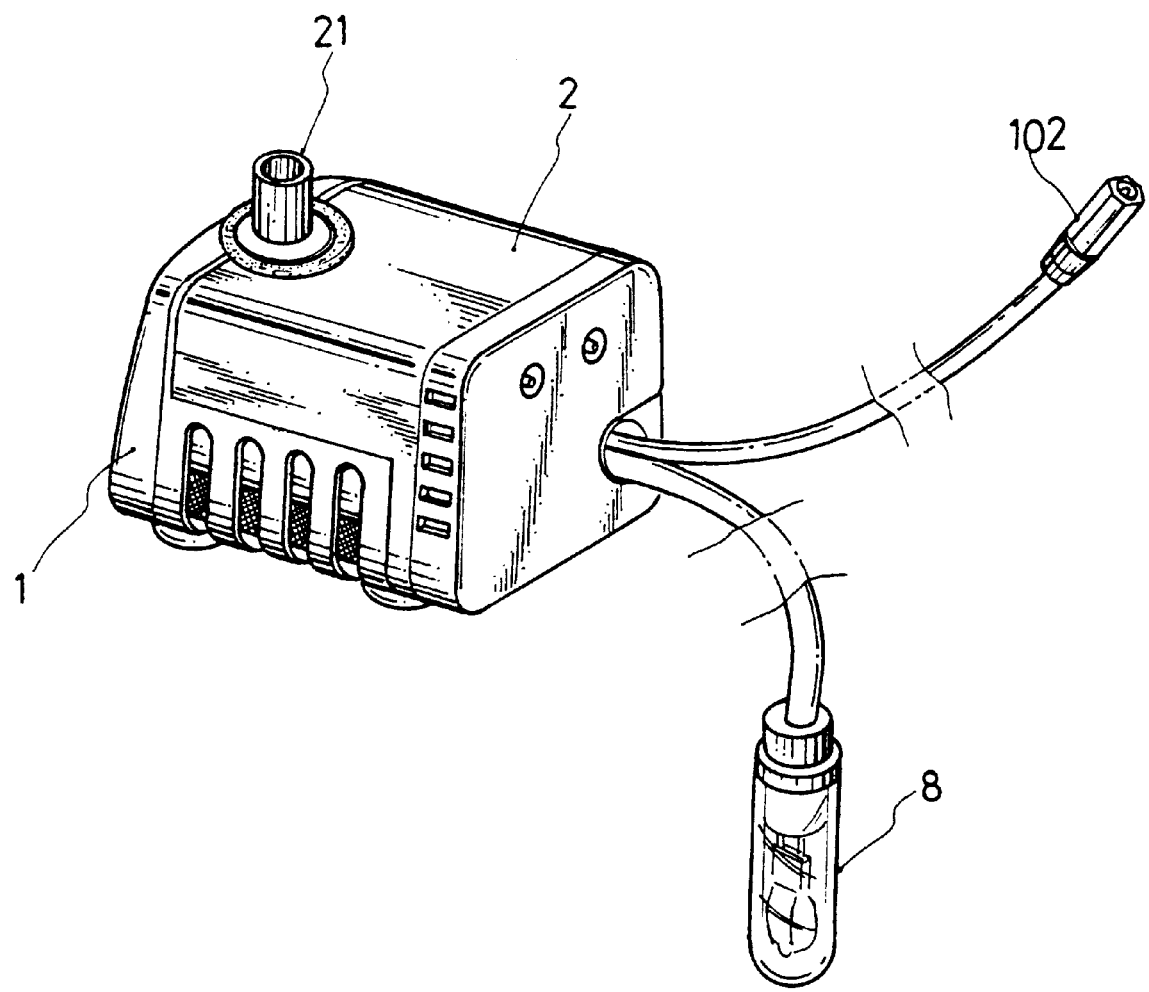
FIG. 1 is a perspective view of the present invention.
Figure 2:
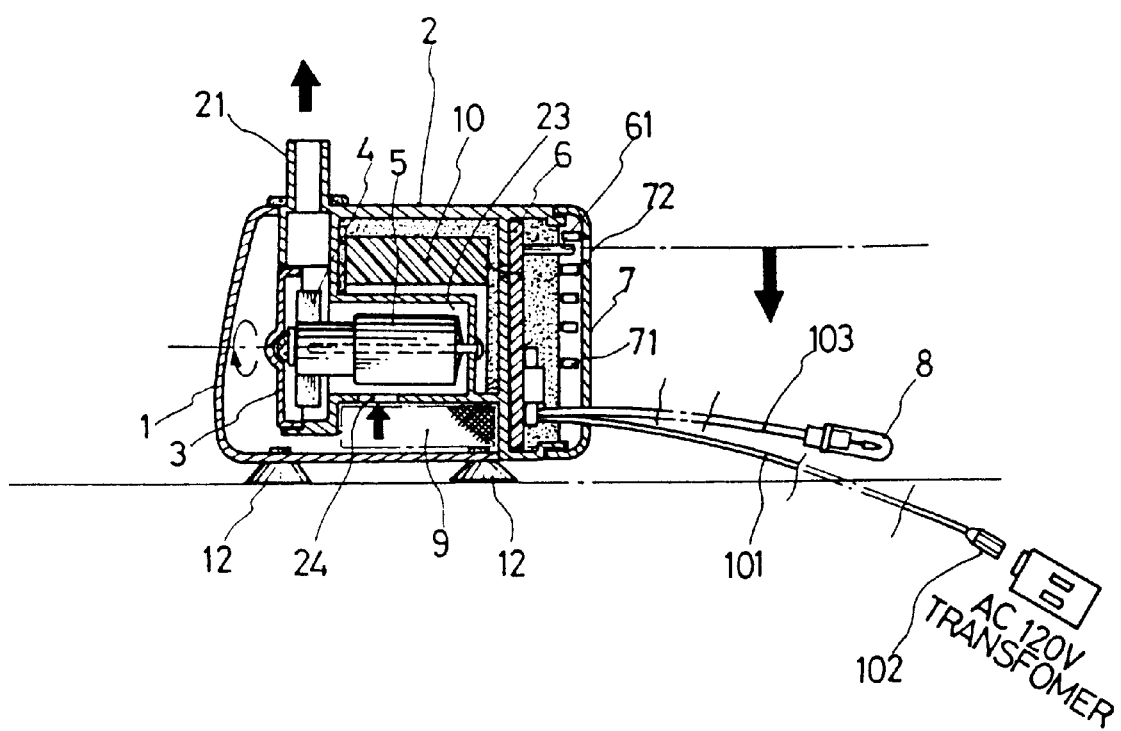
FIG. 2 is sectional view of the present invention.
Figure 3:
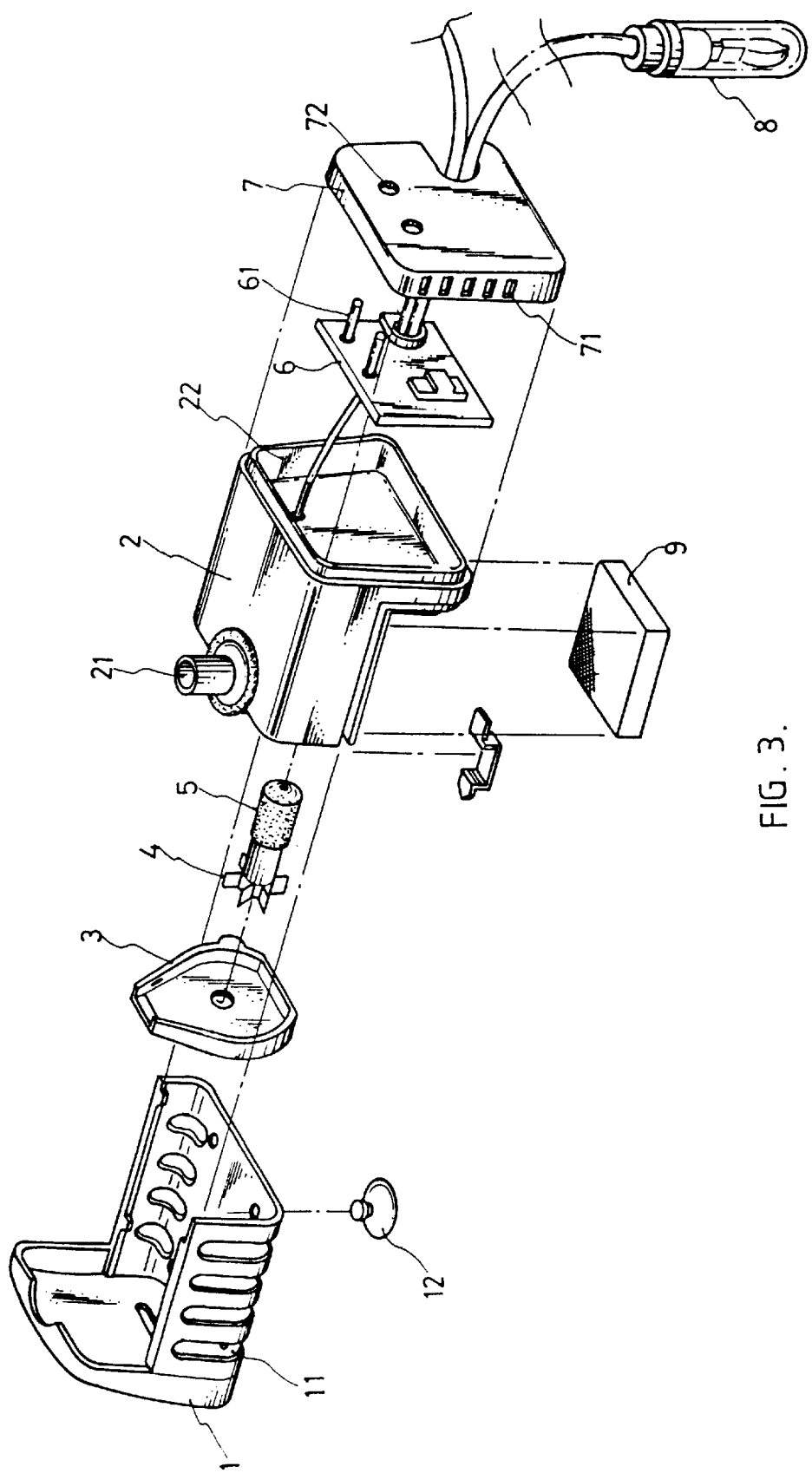
FIG. 3 is an exploded view of the present invention.
Figure 4:
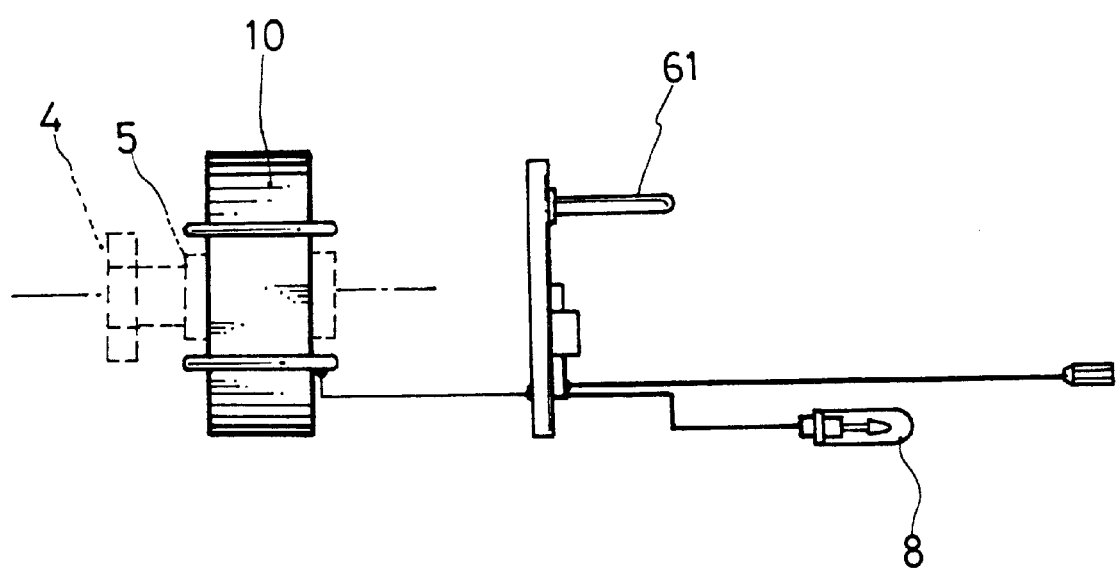
FIG. 4 illustrates the relationship between the motor and the circuit board.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

With reference to the drawings and in particular to FIGS. 1, 2, 3 and 4 thereof, the submerged motor according to the present invention generally comprises a lower housing 1, an upper housing 2, a cap 3, an impeller 4, a rotor 5, a circuit board 6, an outer cover 7, a halogen light 8, and a sponge 9.

The lower housing 1 is formed with a plurality of openings 11 for the passage of water and provided with a plurality of suckers 12 at the bottom for keeping the submerged motor in place. The upper housing 2 is engaged with the top of the lower housing 1 and formed with a water outlet 21 at the top thereof. A motor which includes the rotor 5 and a solenoid 10 enclosing the rotor 5 is fitted within a chamber 23 of the upper housing 2. The cap 3 is covered on the chamber 23 to keep the impeller 4 from damage. The chamber 23 is in communication with the water outlet 21 and has a hole 24 communicated with the lower housing 1. The motor is electrically connected with the circuit board 6 which is fitted in a recess 22 formed at an outer side of the upper housing 2. The circuit board 6 is provided with a pair of sensors and connected with an electrical plug 102 via a first electrical cord 101 and a halogen light 8 via a second electrical cord 103. The impeller 4 is fixedly mounted on the rotor 5 of the motor, so that when the motor rotates, the impeller 4 will be rotated in unison with the rotor 5 thereby forcing water of the outlet 21. The cover 7 is configured to engage with the upper housing 2 so as to close the recess 22 thereby protecting the circuit board 6 from damage. The cover 7 is formed with a plurality of openings 71 for the passage of water and two holes 72 aligned with the two sensors 61. The sponge 9 is fitted in the lower housing 1 and arranged under the hole 24 of the chamber 23 of the upper housing 2 for filtering the water passing through the lower and upper housings 1 and 2.

Figure 5:
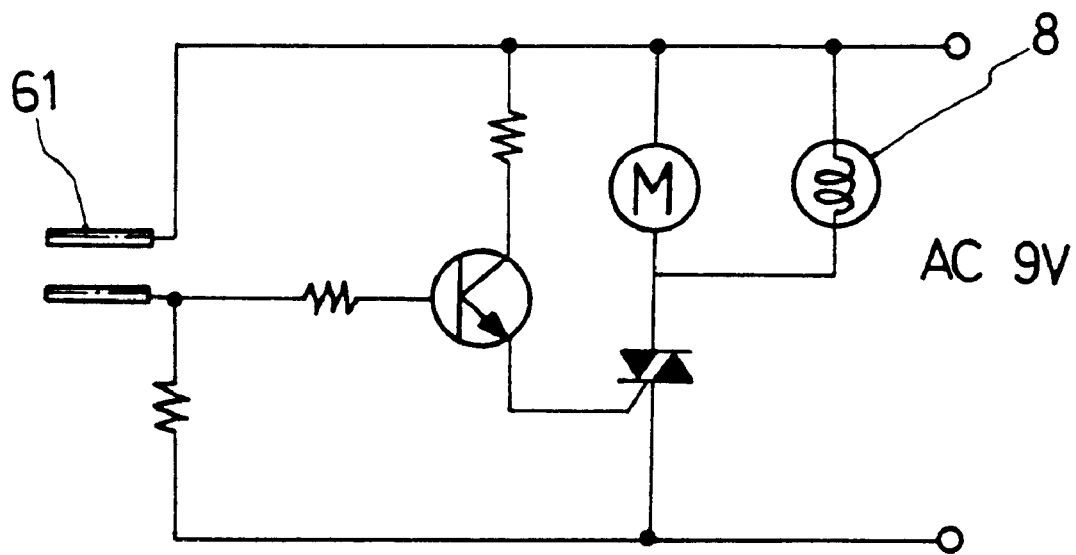
FIG. 5 is a circuit diagram of the present invention.

FIG. 5 is a circuit diagram of the present invention. As illustrated, the sensors 61 are connected with a control circuit, so that only when both of the sensors 61 are immersed in water will the control circuit be closed thereby causing the motor to stop rotating and the halogen be turned off when the sensors 61 are above the water level and therefore preventing accidents by overheating of the motor.

Figure 6:
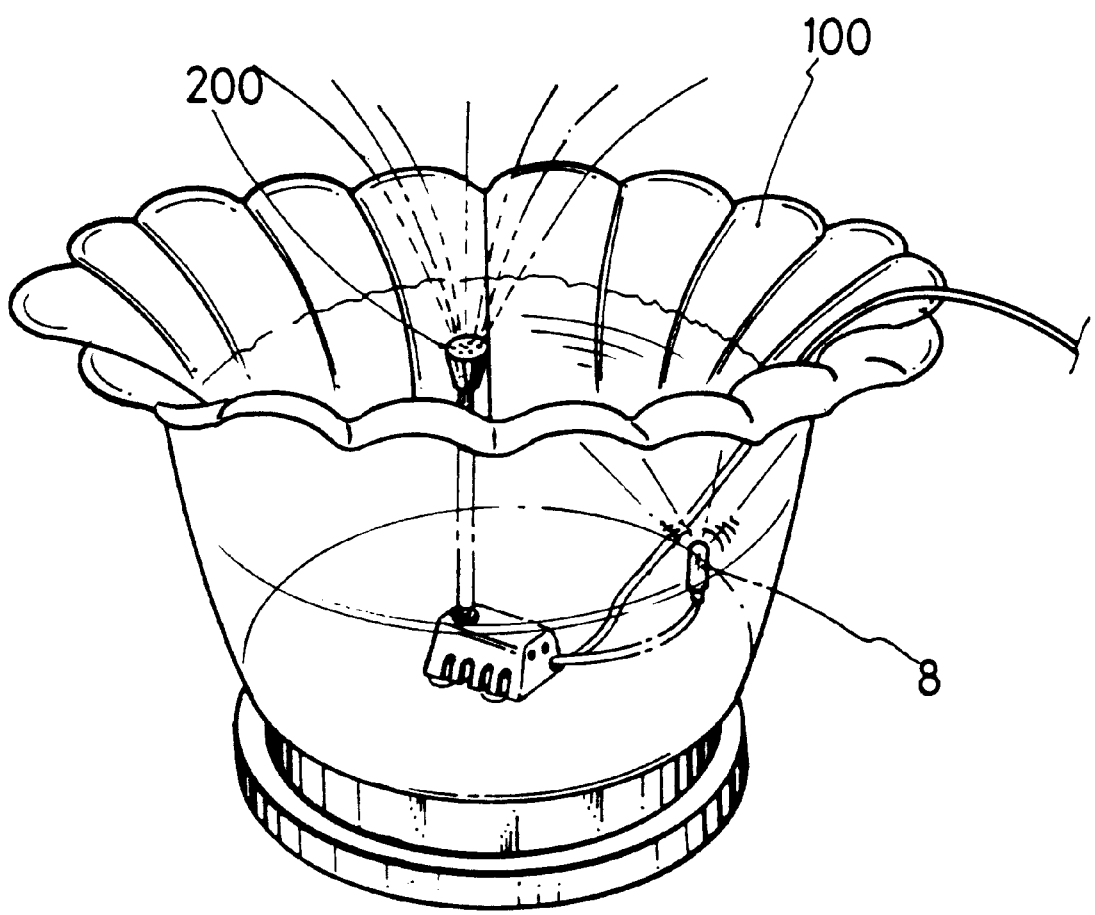
FIG. 6 is a working view of the present invention.

FIG. 6 is working view of the present invention. As shown, the submerged motor according to the present invention is placed into a decorated container 100 and a sprayer 200 is engaged with the outlet 21 so that when the power is turned on, water will be sprayed out of the outlet 21 to form an artificial fountain and the halogen light 8 will give light to adorn the fountain. However, as the water level comes below either one or both of the sensors 61, the circuit will be opened and the power supplied to the motor will be cut off thereby turning off the motor and the halogen light and therefore preventing accidents caused by the overheating of the motor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A submerged motor comprising:

a lower housing formed with a plurality of openings for passage of water;

an tipper housing engaged with a top of said lower housing and formed with a water outlet at a top thereof;

a motor including a rotor and a solenoid enclosing said rotor and being fitted within a chamber of said upper housing, said chamber being in communication with said water outlet and has a hole communicated with said lower housing, said motor being electrically connected with a circuit board which is fitted in a recess of said upper housing, said circuit board being provided with a pair of sensors and connected with an electrical plug via a first electrical cord, an impeller being fixedly mounted on said rotor so that when said motor is turned on, said impeller will be rotated in unison with said rotor thereby forcing water of said outlet; and a cover configured to engage with said upper housing so as to close said recess thereby protecting said circuit board from damage;

wherein said lower housing is provided with a plurality of suckers at a bottom thereof for keeping said lower housing in place, a sponge is fitted in said lower housing and arranged under said hole of said chamber of said upper housing for filtering water passing through said lower and upper housings, a halogen light is connected to said circuit board via a second electrical cord, and said cover is formed with a plurality of openings for passage of water and two holes aligned with said two sensors.

* * * * *